(12) United States Patent
Hu et al.

(10) Patent No.: US 11,454,378 B2
(45) Date of Patent: Sep. 27, 2022

(54) PANEL STRUCTURE FOR STAMPING OF INTEGRALLY FORMED LAMP PANEL, AND LAMP

(71) Applicant: Xmart Lighting Co., Ltd., Guangdong (CN)

(72) Inventors: Zhongxiao Hu, Guangdong (CN); Gengu Huang, Guangdong (CN)

( * ) Notice: Subject to any disclaimer, the term of this patent is extended or adjusted under 35 U.S.C. 154(b) by 0 days.

(21) Appl. No.: 17/164,847

(22) Filed: Feb. 2, 2021

(65) Prior Publication Data

US 2022/0034485 A1    Feb. 3, 2022

(30) Foreign Application Priority Data

Jul. 30, 2020  (CN) ......................... 202010753289.X
Jul. 30, 2020  (CN) ......................... 202021554474.8

(51) Int. Cl.
| | |
|---|---|
| F21V 17/06 | (2006.01) |
| F21S 4/28 | (2016.01) |
| F21V 1/26 | (2006.01) |
| F21V 1/04 | (2006.01) |
| F21S 8/04 | (2006.01) |
| F21Y 115/10 | (2016.01) |

(52) U.S. Cl.
CPC ............... *F21V 17/06* (2013.01); *F21S 4/28* (2016.01); *F21V 1/04* (2013.01); *F21V 1/26* (2013.01); *F21S 8/04* (2013.01); *F21Y 2115/10* (2016.08)

(58) Field of Classification Search
CPC .... F21V 17/06; F21V 1/04; F21V 1/26; F21S 4/28
See application file for complete search history.

(56) References Cited

U.S. PATENT DOCUMENTS

2008/0247175 A1* 10/2008 Yoon .......................... B32B 3/26
428/156

* cited by examiner

*Primary Examiner* — Thomas M Sember
(74) *Attorney, Agent, or Firm* — Prakash Nama; Global IP Services, PLLC

(57) ABSTRACT

The present application relates to a panel structure for stamping of an integrally formed lamp panel. The panel structure for stamping of the integrally formed lamp panel at least includes a reflective film layer, an adhesion layer, a base material layer and a protective layer, wherein the reflective film layer is arranged on one surface of the base material layer through the adhesion layer, and the protective layer is arranged on the other surface of the base layer; the base material layer includes a metal layer, and a chemical treatment layer arranged on at least one surface of the metal layer, the base material layer can be integrally formed lamp panel with the reflective film layer. The present application has the following beneficial effects: the panel structure can be applied to stamping of the integrally formed lamp panel; the yield is increased and the production efficiency is improved.

18 Claims, 6 Drawing Sheets

PANEL STRUCTURE FOR STAMPING OF INTEGRALLY FORMED LAMP PANEL, AND LAMP

BACKGROUND OF THE INVENTION

The present application relates the technical field of hardware manufacturing, and in particular, to a panel structure for stamping of an integrally formed lamp panel, and a lamp.

With the maturity of the LED production technology, the LED has been gradually applied in the field of lighting, which has various advantages of energy saving, environmental friendliness, long service life and the like and has become the mainstream of green energy light source in the future. The main structure of the traditional embedded lamps for ceilings light steel frames includes a rectangular shell. During manufacturing of the shell, a plurality of panels are produced and are spliced together. The process is tedious and the production efficiency is low. Integral formation of the lamp panel is difficult to realize. The steel in the existing process is often prone to damage under large-angle impact, and the yield is low. Meanwhile, the existing lamp panel is often coated or sprayed with powder paint after production, thereby achieving the light-reflecting effect. After the lamp panel is formed, it is difficultly coated (sprayed with powder pain) and the cost is high. The powder paint spraying is a high-pollution industry. On the premise that China advocates environmental protection, our company optimizes the process of replacing back powder paint spraying by the front coating. The existing manufacturing process of the lamp panel is difficult to meet the current requirements of high efficiency and low cost.

BRIEF SUMMARY OF THE INVENTION

To overcome the problem in the prior art that the steel plate of the lamp panel is difficult to be stamped and formed at a large angle, the technical problem to be solved by the present application is to provide a panel structure for stamping of an integrally formed lamp panel, and a lamp panel.

A panel structure for stamping of an integrally formed lamp panel at least includes a reflective film layer, an adhesion layer, a base material layer and a protective layer, wherein the reflective film layer is arranged on one surface of the base material layer through the adhesion layer, and the protective layer is arranged on the other surface of the base layer; and the base material layer includes a metal layer, and a chemical treatment layer arranged on at least one surface of the metal layer; and the adhesion layer covers the reflective layer on the base material layer by adhering to the chemical treatment layer.

Optionally, the protective layer is paint or a PP back film.

Optionally, chemical treatment layers are arranged on both sides of the metal layer, the protective layer is a reflective film, and the protective layer adheres to one surface of the base material layer.

Optionally, a reflectivity of the reflective film layer is greater than 95%.

Optionally, a viscosity value of the adhesion layer is 70-981 mPa·s~81 mPa·s.

Optionally, the metal layer is a steel substrate, and each of the chemical treatment layers is an oxidation layer formed after a surface of the steel substrate is subjected to strong alkali and passivation.

Optionally, a roughness of the steel substrate is 0.3-0.6.

Optionally, a yield strength of each of the base material layer and the reflective film layer is greater than 180 N/mm2, a tensile strength of each of the base material layer and the reflective film layer is 310 N/mm2 to 420 N/mm2, and an elongation percentage of each of the base material layer and the reflective film layer is greater than 35%.

Furthermore, the present application further provides a lamp, including a lamp panel, an LED lamp bar, a light source driving assembly and a lampshade, wherein the LED lamp bar is arranged in a light source groove of the lamp panel, the light source driving assembly is arranged outside the light source groove and is electrically connected to the LED lamp bar, the lampshade is arranged at an opening of the light source groove, and the LED lamp bar emits a light source to be projected outward through the lampshade; and the lamp panel is stamped and formed by the above panel structure for stamping of the integrally formed lamp panel.

Optionally, the lamp is a space lamp. The lamp panel is at least provided with an outer frame, a light source groove, a first panel and a second panel; the light source groove is opened along an projection direction of the light source; two sides of the light source groove are connected to two sides of the outer frame through the first panel; and the second panel is connected among the light source groove, the first panel and the outer frame.

Optionally, a mounting hole for mounting the LED lamp bar is formed at the bottom of the light source groove, and a wire groove communicating the light source groove with the outside is formed at the bottom of the light source groove; and a buckle for fixing the lampshade is arranged on a side wall of the light source groove, and a limiting block is arranged on the second panel.

Optionally, first folded edges are formed on four sides of the outer wall along an opposite direction of light source protection; and hanging buckles are arranged on the first folded edges, and a plurality of hanging buckles are fixed on four first folded edges respectively through bolts or pulling rivets.

An included angle between the first panel and the outer frame is 161° to 165°, an included angle between the second panel and the outer frame is 98° to 102°, and an included angle between the side wall of the light source groove and the first panel is 137° to 141°.

Optionally, the LED lamp bar is fixed on the mounting hole of the light source groove through a bolt or a pulling rivet, a connecting wire of the LED lamp bar passes through the wire groove of the light source groove and is electrically connected to the light source driving assembly, an inductor is arranged at the bottom of the light source groove, and the inductor is arranged adjacent to the LED lamp bar.

Optionally, the light source driving assembly includes a driving shell and a light source driver arranged in the driving shell; the driving shell is fixedly connected to the lamp panel through the second panel, one end of the driving shell is in lap joint to the light source groove, and one end of the driving shell abuts against the first folded edges of the outer frame; the driving shell is provided with a wire hole connected to the wire groove, and an opening and closing door is arranged on the shell; and the light source driving assembly further includes a standby power supply, and the standby power supply is fixed in the driving shell and is arranged adjacent to the light source driver.

A section of the lampshade is U-shaped, two free ends of the lampshade are bended outward to form second folded edges, the second folded edges are clamped on the buckle in the light source groove, and the other two ends of the lampshade abuts against the limiting block of the second panel.

Optionally, the lamp is a panel lamp, the lamp panel includes a light source groove and a surface frame, one side of the light source groove is open, and the surface frame is arranged along the side wall of the light source groove; and the lampshade extends into the light source groove along the opening of the light source groove and is in lap joint to an upper surface of the surface frame.

Optionally, a longitudinally arranged and/or a transversely arranged mounting groove are formed at the bottom of the light source groove, a wire groove is formed at the side wall of the light source groove, the LED lamp bar is fixed on the mounting groove through glue, and the connecting wire of the LED lamp bar passes through the wire groove and is electrically connected to the light source driving assembly.

Optionally, the light source driving assembly includes a driving shell and a light source driver arranged in the driving shell; the driving shell is arranged along an outer side of the light source groove, the driving shell is provided with a wire hole connected to the wire groove, and an opening and closing door is arranged on the shell; and the light source driving assembly further includes a standby power supply, and the standby power supply is fixed in the driving shell and is arranged adjacent to the light source driver.

Optionally, an inner side of the lampshade is provided with wave grains or bead grains or frosted grains.

Compared with the prior art, the present application has the following beneficial effects:

(1) the panel structure according to the present application includes a reflective film layer, an adhesion layer, a base material layer and a protective layer; the reflective film with the reflectivity greater than 95%, the yield strength, a yield strength of each of the base material layer and the reflective film layer is greater than 180 N/mm2, a tensile strength of each of the base material layer and the reflective film layer is 310 N/mm2 to 420 N/mm2, and an elongation percentage of each of the base material layer and the reflective film layer is greater than 35%; the panel structure according to the present application can be applied to stamping of the integrally formed lamp panel; the yield is increased and the production efficiency is improved; meanwhile, a reflective film is additionally arranged on the base material layer, thereby improving the reflection effect and reducing the film laminating cost.

(2) The lamp panel of the lamp according to the present application is integrally stamped and formed by the above panel structure, thereby simplifying the production process, improving the production efficiency and reducing the production cost. The lampshade is fixed on the lamp panel by the buckle and the limiting block, thereby making fixation firmer. First folded edges are formed on the outer frame of the lamp panel according to the present application and the strength of the lamp panel is improved through the first folded edges; meanwhile, connection to the power driving assembly and the hanging buckle is facilitated. The power driving assembly is provided with a power driver; meanwhile, the power driving assembly may be provided with a standby power supply for the sustainable use of the lamp after power failure. The outer frame, the light source groove, the first panel and the second panel are connected into an oblique bottom type lamp panel, so that a plurality of lamp panel may be directly stacked up, thereby reducing the stacking area of the lamp panels and improving the transportation efficiency of the lam panels. The inner side of the lampshade according to the present application is provided with wave grains or bead grains or frosted grains, thereby achieving the anti-glare effect and softening light.

DETAILED DESCRIPTION OF THE INVENTION

The present application is further described below with reference to the specific embodiments.

The same or similar reference numbers in the accompanying drawings of the embodiments of the present application correspond to the same or similar parts. In the description of the present application, it should be understood that an azimuth or position relationship indicated by terms "upper", "lower", "left", "right", "top", "bottom", "inner", "outer" and the like is an azimuth or position relationship based on the accompanying drawings, which is only for facilitating description of the present application and simplifying description, but not indicates or implies that the referred device or component must have a specific azimuth and perform construction and operation in the specific azimuth; therefore, the terms describing the position relationship in the accompanying drawings are only for exemplary description, but cannot be interpreted as a limitation to the patent.

In addition, if the terms "first" and "second" are only for description, they are mainly used for distinguish different devices, components and constituent parts (specific types and structures may be the same or different), are not intended to indicate or imply the relative importance and number of the indicated devices, components or constituent parts and cannot be interpreted as indicating or implying relative importance.

Figure 1:
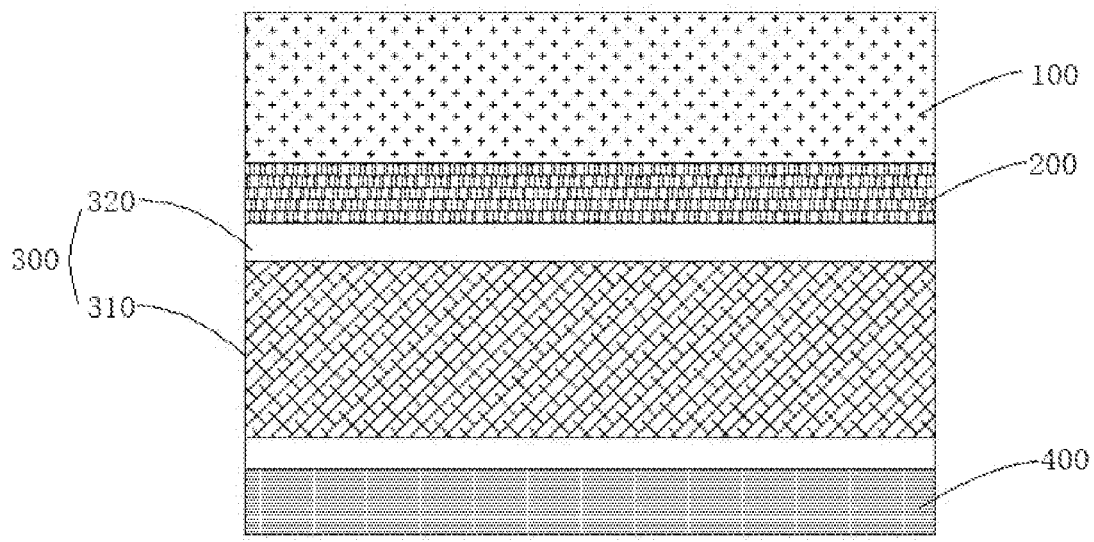
FIG. 1 is a schematic structural diagram of a panel structure according to the present application.

In the embodiment shown in FIG. 1, the present application provides a panel structure for stamping of an integrally formed lamp panel. The panel structure for stamping of the integrally formed lamp panel at least includes a reflective film layer 100, an adhesion layer 200, a base layer 300 and a protective layer 400, wherein the reflective film layer 100 is arranged on one surface of the base material layer 300 through the adhesion layer 200, and the protective layer 400 is arranged on the other surface of the base material layer 300;

the base material layer 300 includes a metal layer 310, and a chemical treatment layer 320 arranged on at least one surface of the metal layer 310; and the adhesion layer 200 covers the reflective film layer 100 on the base material layer 300 by adhering to the chemical treatment layer 320. In the embodiment, the panel structure according to the present application includes a reflective film layer 100, an adhesion layer 200, a base layer 300 and a protective layer 400 which are sequentially stacked, wherein the reflective film layer 100 is arranged on the base material layer 300 through the adhesion layer 200. The panel structure according to the present application can be applied to stamping of the integrally formed lamp panel; the yield is increased and the production efficiency is improved; meanwhile, a reflective film is additionally arranged on the base material layer 300, thereby improving the reflection effect and reducing the film laminating cost.

In one implementation manner of the above embodiment, the protective layer 400 is paint or a PP back film. A surface of the metal layer 310 may be directly roll-coated with the protective layer 400, or a surface of the chemical treatment layer 320 may be roll-coated with the protective layer. The paint may be any oxidation-resistant paint which the metal surface may be coated with in the market, thereby preventing corrosion of metal caused by erosion of oxygen, water and the like and protecting the panel. Meanwhile, the paint may provide different color samples according to the demand so as to improve the aesthetic feeling of the product.

In one implementation manner of the above embodiment, the chemical treatment layers 320 are arranged on both sides of the metal layer 310, the protective layer 400 is a reflective film, and the protective layer 400 adheres to one surface of the base material layer 300. In the embodiment, the protective layer 400 may be a reflective film layer 100 so as to improve the reflectivity of the light source.

In one implementation manner of the above embodiment, the reflectivity of the reflective film layer 100 is greater than 95%. In the embodiment, the reflective film of the reflective film layer 100 may include a transparent film sheet and a reflective film sheet, the reflective film sheet and the transparent film sheet are bonded together by an adhesive, and the other side of the reflective film sheet is coated with a reflective coating. The reflective film of the reflective film layer 100 may further include a reflective film base material and a coating, wherein the reflective film base material has an ABA three-layer co-extrusion structure, and one surface of the reflective film base material is coated with the coating; the coating is prepared into coating liquid before coating; the coating liquid consists of the following components: a solvent, an adhesive, an isocyanate crosslinking agent, a large particle with a particle size of 15 μm to 30 μm and a small particle (2 wt % to 8 wt %) with a particle size of 5 μm to 15 μm; the reflective film base material has an ABA three-layer co-extrusion structure; a B layer of the reflective film base material consists of the following components: 69% to 92% of polyester, 5% to 15% of inorganic particle with a particle size of 2 μm to 5 μm, 2% to 8% of organic foaming agent and 1% to 8% of antistatic agent; and an A layer of the reflective film base material consists of the following components: 80% to 95% of polyester and 5% to 20% of silicon dioxide particle with a particle size of 2 μm to 5 μm. The reflectivity of the above two reflective film structures is greater than 95%. The utilization rate of the light source is greatly increased.

In one implementation manner of the above embodiment, a viscosity value of the adhesion layer 200 is 70 mPa·s~81 mPa·s In the embodiment, the adhesion layer 200 may compound the reflective film on the base material layer for integrated forming production of the reflective film and the base material layer 300 when adopting the adhesive with the viscosity of 70 mPa·s, 73 mPa·s, 76 mPa·s, 78 mPa·s and 81 mPa·s. The adhesive may be a solvent type polyurethane adhesive.

In one implementation manner of the above embodiment, the metal layer 310 is a steel substrate, and the chemical treatment layer 320 is an oxidation layer formed after a surface of the steel substrate is subjected to strong alkali and passivation. In the embodiment, the metal layer 310 is specifically a steel substrate, the chemical treatment layer 320 is specifically an oxidation layer after chemical treatment of strong alkali, passivation and the like, a roughness of the steel substrate is 0.3 to 0.6, and the roughness of the steel substrate may be 0.3, 0.4, 0.5 and 0.6. The oxidation layer is a structure produced through chemical reaction on the surface of the steel substrate.

In one implementation manner of the above embodiment, a yield strength of each of the base material layer 300 and the reflective film layer 100 is greater than 180 N/mm2, a tensile strength of each of the base material layer 300 and the reflective film layer 100 is 310 N/mm2 to 420 N/mm2, and an elongation percentage of each of the base material layer 300 and the reflective film layer 100 is greater than 35%. In the embodiment, the yield strength, the tensile strength and the elongation percentage are specific parameters of the base material layer 300 and the reflective film layer 100. During material selection, the base material layer 300 and the reflective film layer 100 with the yield strength being greater than 180 N/mm2, the tensile strength being 310 N/mm2 to 420 N/mm2 and the elongation percentage being greater than 35% may realize integral stamping and forming of the panel of the present application, thereby increasing the yield of products.

Figure 2:
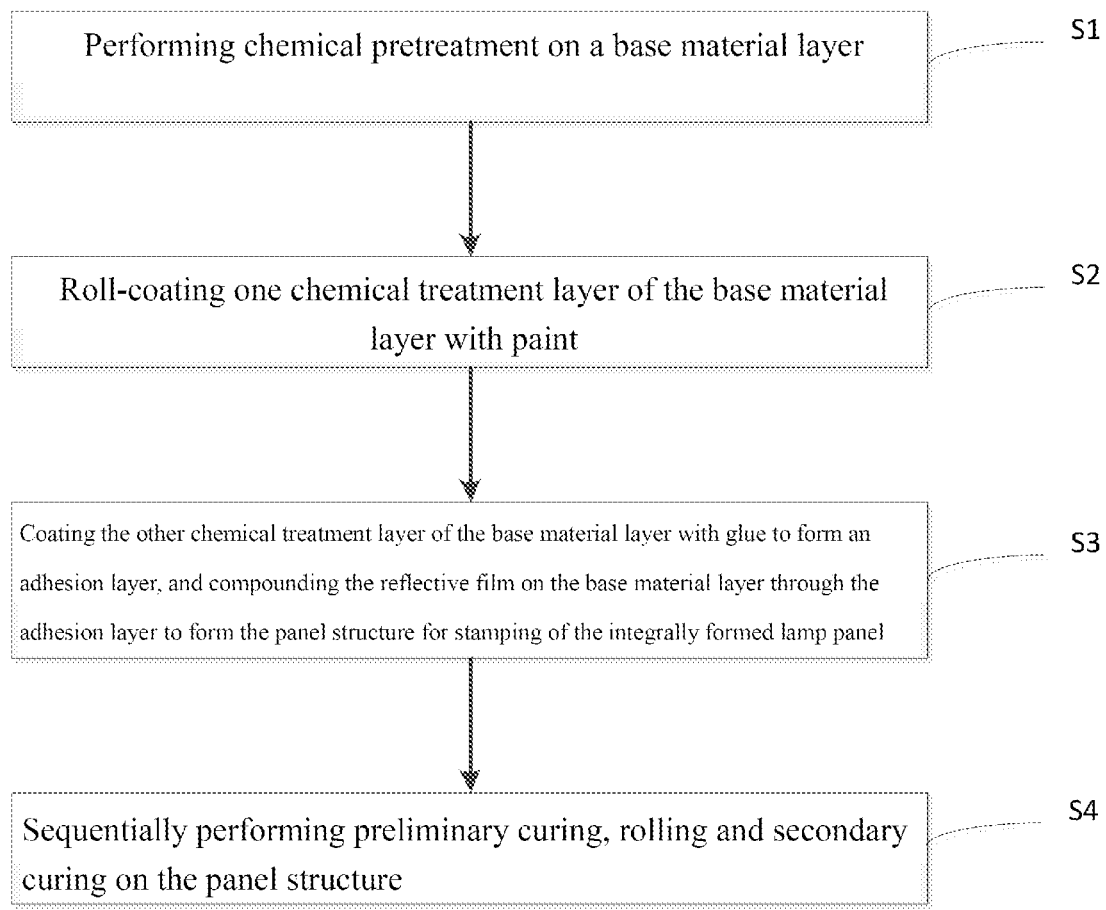
FIG. 2 is a schematic diagram of a production process of a panel according to the present application.
Figure 3:
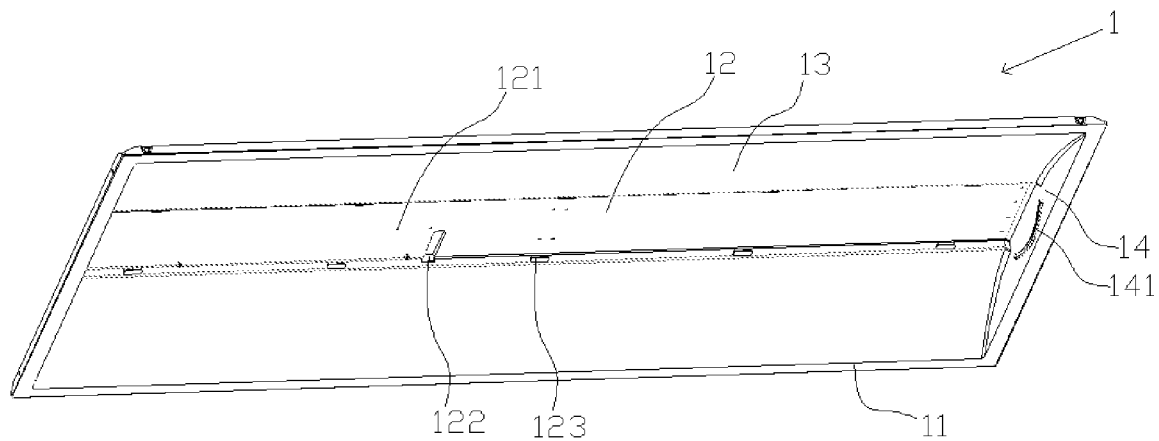
FIG. 3 is a schematic diagram I of a space lamp panel.
Figure 4:
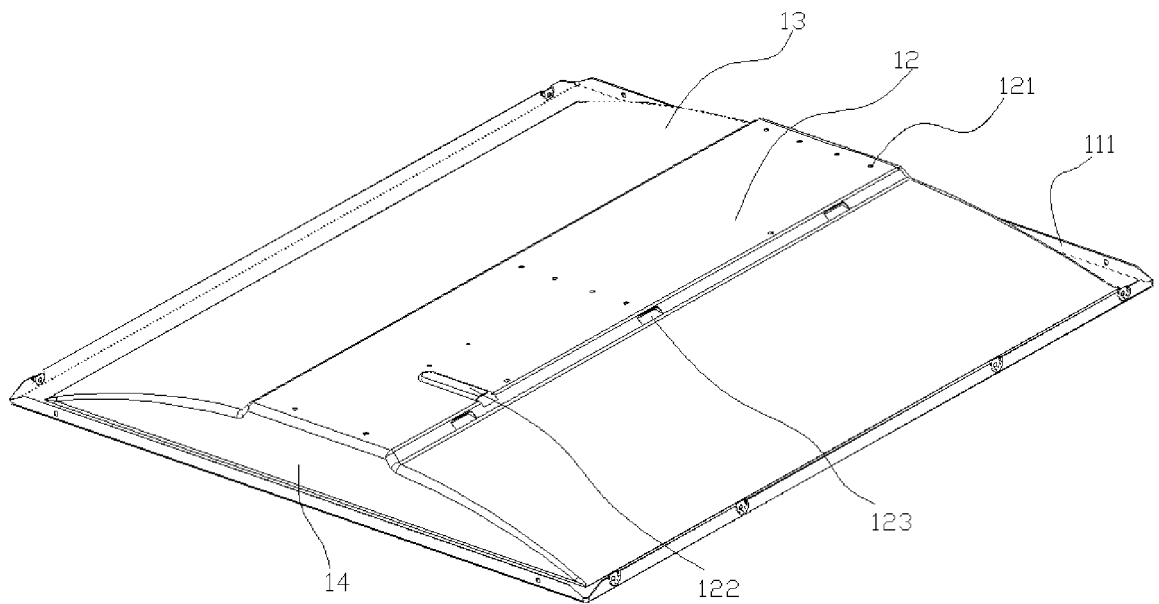
FIG. 4 is a schematic diagram II of a space lamp panel.
Figure 5:
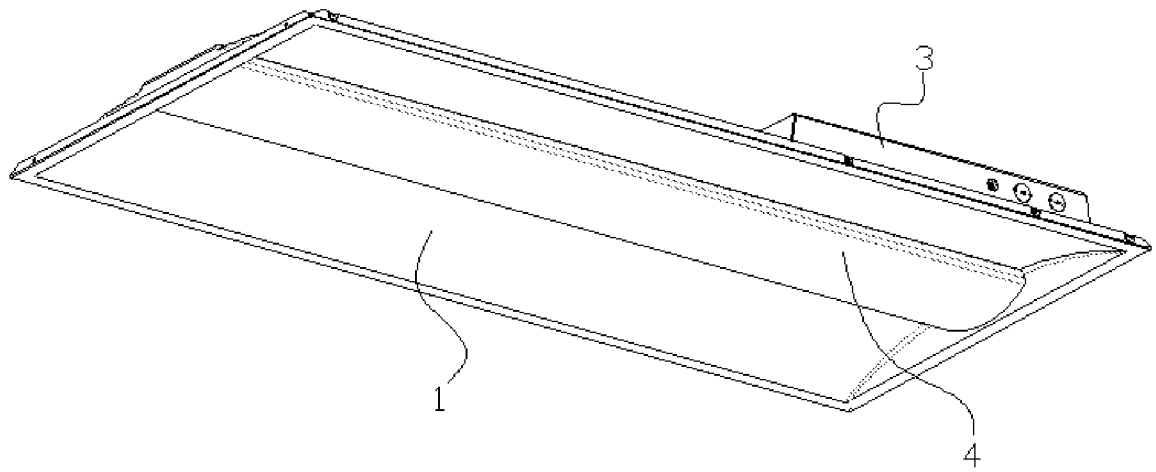
FIG. 5 is a schematic diagram I of a space lamp.
Figure 6:
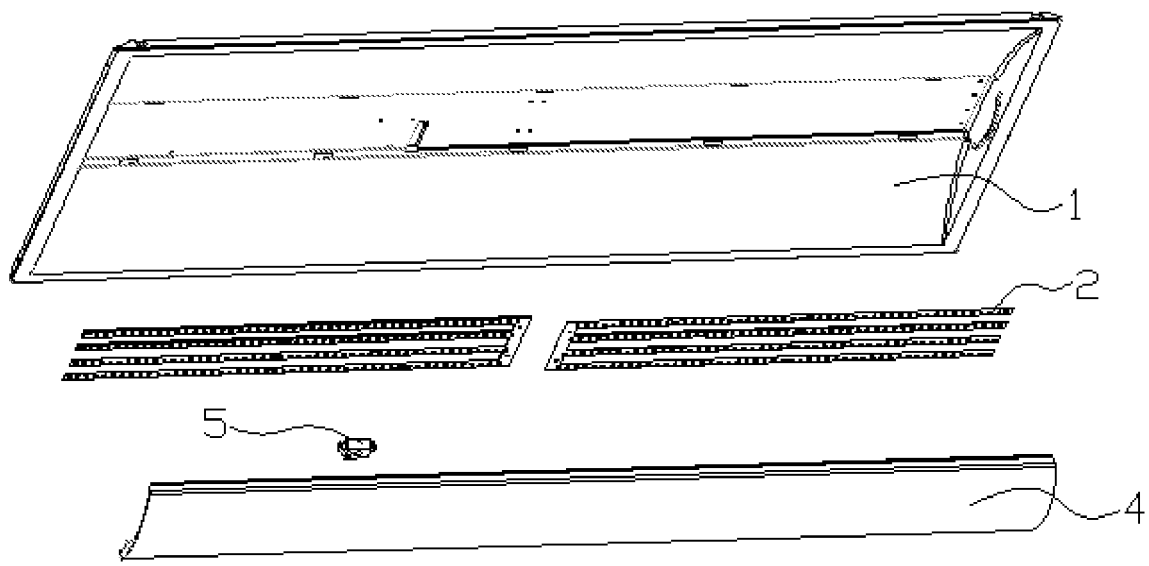
FIG. 6 is an explosive view of a space lamp.
Figure 7:
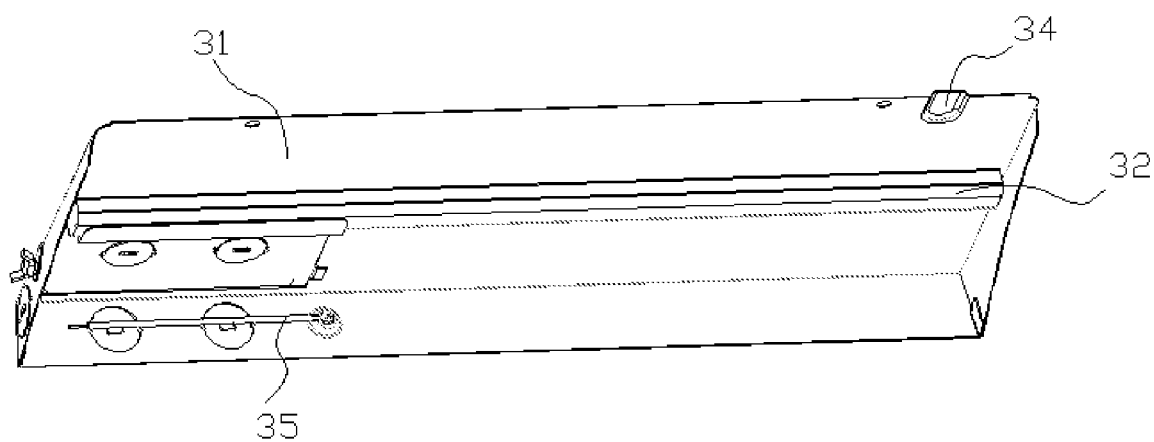
FIG. 7 is a space light source driving assembly I.
Figure 8:
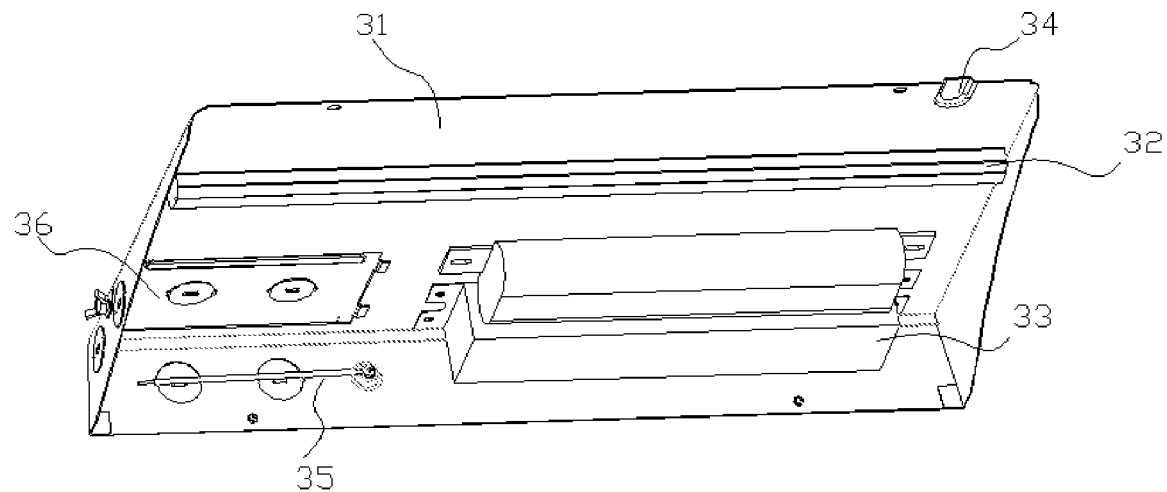
FIG. 8 is a space light source driving assembly II.
Figure 9:
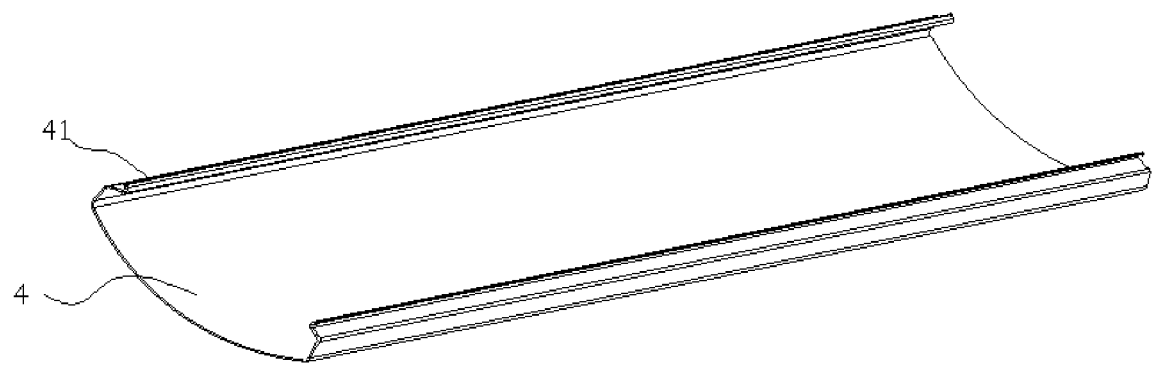
FIG. 9 is a schematic diagram of a space lampshade.
Figure 10:
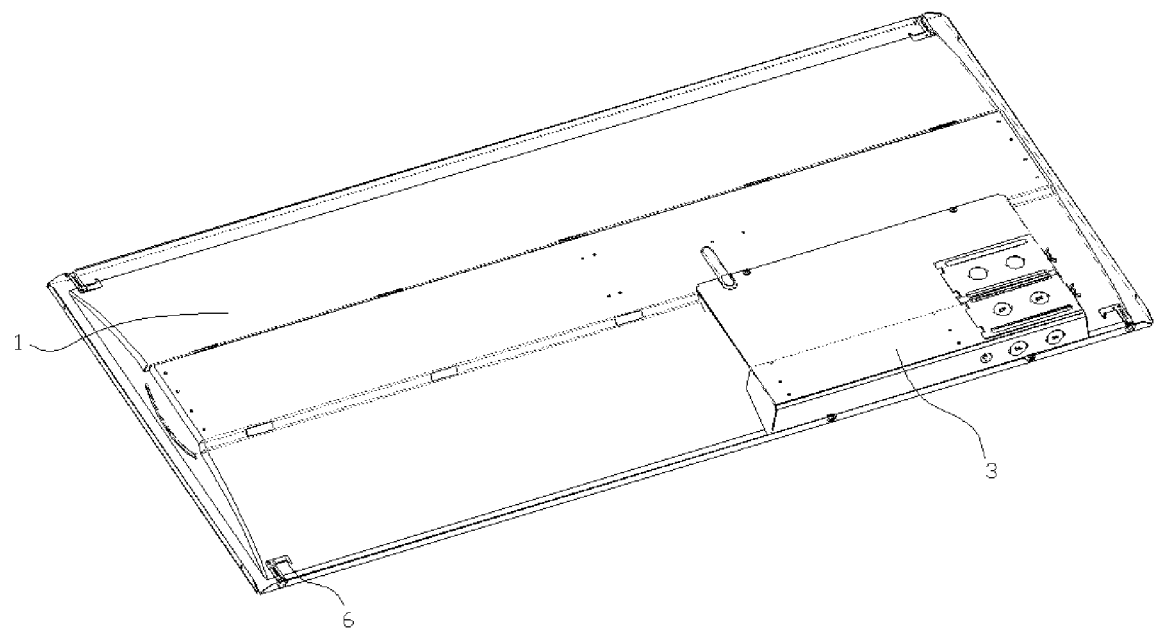
FIG. 10 is an installation schematic diagram of a space hanging buckle.

In one embodiment shown in FIG. 2, the present application further provides a manufacturing process for the panel structure for stamping of the integrally formed lamp panel. The manufacturing process is characterized by at least including the following steps:

S1, a base material layer 300 is subjected to chemical pretreatment.

In the step S1, performing chemical pretreatment on a metal layer 310 of the base material layer 300 includes: a steel substrate of the base material layer 300 is sequentially cleaned, subjected to strong alkali, brushed, washed with clean water, dried, passivated and dried to form a chemical treatment layer 320. Specifically, after being cleaned, the base material layer 300 is soaked and brushed in the strong alkali with PH greater than 12; after the base material layer 300 is cleaned with clean water and dried, a surface of the base material layer 300 passivated through strong oxidant or electrochemical method oxidation treatment to improve the corrosion resistance of the base material layer 300, and the chemical treatment layer 320 is generated on the metal layer 310 of the base material layer 300.

S2, one chemical treatment layer 320 of the base material layer 300 is roll-coated with paint.

In the step S2, a back side of the base material is roll-coated with the paint or bonded with a PP protective film to form a protective layer 400, thereby protecting a base material plate better during film covering. The front side is covered with the reflective film, and the back side is roll-coated with the paint or covered with the PP protective film. The base material layer 300 is roll-coated with the paint, thereby further protecting the base material layer 300 and preventing oxidation and aging of the base material layer 300.

S3, the other chemical treatment layer 320 of the base material layer 300 is coated with glue to form an adhesion layer 200, and the reflective film is compounded on the base material layer 300 through the adhesion layer 200 to form the panel structure for stamping of the integrally formed lamp panel.

In the step S3, one surface, not roll-coated with the paint, of the base material layer 300 is coated with an adhesive to form the adhesion layer 200, and then the base material layer 300 is covered with the reflective film to form a complete panel structure.

S4, the panel structure is sequentially subjected to preliminary curing, rolling and secondary curing.

In the step S4, after the panel structure is formed, the panel structure is subjected to preliminary curing through standing, the panel is rolled and then is subjected to secondary curing and formation in a curing furnace, so that the panel is finally formed, wherein after preliminary curing, the panel structure may be detected to judge whether the compounding degree of the reflective film and the base material layer 300 meets requirements, thereby increasing the yield of the products.

In addition, in the embodiment shown in the figure, the present application further provides a lamp. The lamp includes a lamp panel, an LED lamp bar, a light source driving assembly and a lampshade, wherein the LED lamp bar is arranged in a light source groove of the lamp panel, the light source driving assembly is arranged outside the light source groove and is electrically connected to the LED lamp bar, the lampshade is arranged at an opening of the light source groove, and the LED lamp bar emits a light source to be projected outward through the lampshade; and the lamp panel is stamped and formed by the panel structure for stamping of the integrally formed lamp panel. The lamp panel according to the present application is stamped and integrally formed in a mold, thereby simplifying the production process, improving the production efficiency and reducing the production cost. The lamp panel is stamped and formed by the panel structure for stamping of the integrally formed lamp panel. The panel structure according to the present application includes a reflective film layer, an adhesion layer, a base material layer and a protective layer. The reflectivity of the reflective film is greater than 95%. In the base material layer and the reflective film layer, the yield strength is greater than 180 N/mm2, the tensile strength is 310 180 N/mm2 to 420 N/mm2, and the elongation percentage is greater than 35%. The panel structure according to the present application can be applied to stamping of the integrally formed lamp panel; the yield is increased and the production efficiency is improved; meanwhile, a reflective film is additionally arranged on the base material layer, thereby improving the reflection effect and reducing the film covering cost. The lamp panel of the lamp according to the present application is integrally stamped and formed by the above panel structure, thus simplifying the production process, improving the production efficiency and reducing the production cost.

In some embodiments, referring to FIG. 3 to FIG. 10, the lamp may be a space lamp. The lamp panel 1 is at least provided with an outer frame 11, a light source groove 12, a first panel 13 and a second panel 14, wherein the light source groove 12 is opened along an projection direction of the light source; two sides of the light source groove 12 are connected to two sides of the outer frame 11 through the first panel 13; and the second panel 14 is connected among the light source groove 12, the first panel 13 and the outer frame 11. In the embodiment, the lamp panel 1 according to the present application is integrally formed in a mold by a film coating plate. The lamp panel 1 is formed by mutually connecting the outer frame 11, the light source groove 12, the first panel 13 and the second panel 14. The lamp panel 1 according to the present application is integrally stamped and formed in the mold, thus simplifying the production process, improving the production efficiency and reducing the production cost. The first panel consists of a steel substrate and a reflective film, and the reflectivity of the first panel is greater than 96%. According to the present application, the outer frame, the light source groove, the first panel and the second panel are connected into an oblique bottom type lamp panel, and a plurality of lamp panels may be directly stacked, thereby reducing the stacking area of the lamp panels and improving the transportation efficiency of the lamp panels.

In some embodiments, a mounting hole 121 for mounting an LED patch lamp is formed at the bottom of the light source groove 12, and a wire groove 122 communicating the light source groove 12 with the outside is formed at the bottom of the light source groove 12; and a buckle 123 for fixing the lampshade is arranged on a side wall of the light source groove 12, and a limiting block 141 is arranged on the second panel 14. In the embodiment, the light source groove 12 fixes an LED lamp bar 2 through the mounting hole 121, and the LED lamp bar 2 is connected to the light source driving assembly 3 arranged outside the light source groove 12 through the wire groove 122, thus realizing fixation and connection of the LED patch lamp.

In some embodiments, first folded edges 111 are formed on four sides of the outer wall 11 along an opposite direction of light source protection. In this embodiment, the first folded edges 111 are at right angles to the outer frame 11, the lamp panel 1 enhances the strength of the lamp 1 through the first folded edges 111, and connection to the power driving assembly and the hanging buckle is facilitated. A plurality of hanging buckles 6 are arranged on the first folded edges 111 of the outer frame 11 and are fixed on four first folded edges 111 respectively through bolts or pulling rivets. Each of the hanging buckles 6 has a doughnut-shaped structure with one open side. The present application is hung on a keel of a ceiling through the hanging buckles 6. In the embodiment, there are four hanging buckles 6 which are arranged on the four first folded edges 111 respectively.

In some embodiments, an included angle between the first panel 13 and the outer frame 11 is 161° to 165°, an included angle between the second panel 14 and the outer frame 11 is 98° to 102°, and an included angle between a side wall of the light source groove 12 and the first panel 13 is 137° to 141°. In the embodiment, the included angle between the first panel 13 and the outer frame 11 is specifically 163°, the included angle between the second panel 14 and the outer frame 11 is specifically 100°, the included angle between the side wall of the light source groove 12 and the first panel 13 is 139°, and a height from the bottom of the light source groove 12 to the outer frame 11 is 50 mm. By setting the dimensions of the constituent parts of the lamp panel 1, the lamp panel 1 has the best strength, durability and other parameters.

In some embodiments, the LED lamp bar is fixed on the mounting hole of the light source groove through the bolt or the pulling rivet, and a connecting wire of the LED lamp bar passes through the wire groove of the light source groove to be electrically connected to the light source driving assembly. An inductor is arranged at the bottom of the light source groove, and the inductor is arranged adjacent to the LED lamp bar. The LED lamp bar 2 is fixed on the mounting hole 121 of the light source groove 12 through the bolt or the pulling rivet, and a connecting wire of the LED lamp bar 2 passes through the wire groove 122 of the light source groove 12 to be electrically connected to the light source driving assembly 3. An inductor 5 may be arranged at the bottom of the light source groove 12, and the inductor 5 is arranged adjacent to the LED lamp bar 2. The inductor 5 may be a microwave inductor and is configured to detect whether there is someone in the detection range, and if yes, the lamp is turned on.

In some embodiments, the light source driving assembly 3 includes a driving shell 31 and a light source driver 32 arranged in the driving shell 31; the driving shell 31 is fixedly connected to the lamp panel 1 through the second panel 14, one end of the driving shell 31 is in lap joint to the light source groove 12, and the other end of the driving shell 31 abuts against the first folded edges 111 of the outer frame 11. One end of the driving shell 31 is fixed outside the light source groove 12 through the bolt or pulling rivet, and the other end of the driving shell 31 is fixed on the first folded edges 111 of the light source groove 12 through the bolt or pulling rivet. The light source driver 32 is connected to the LED lamp bar 2 through a connecting wire and is configured to drive the LED lamp bar 2 to turn on and off. The light source driver 32 may also be provided with a power adjusting function so as to adjust the brightness of the LED lamp bar 2 in an adjusting range of 0 V to 10 V. The driving shell 31 is provided with a wire hole 34 connected to the wire groove 122. When the driving shell 31 is in lap joint to the light source groove 12, the wire hole 34 is connected to the wire groove 122. The shell is provided with an opening and closing door 36. The opening and closing door 36 is opened or closed by rotating a rotary knob. Operation of the light source driving assembly is facilitated by the opening and closing door 36. The driving shell is also provided with a ground wire 35 for grounding. The light source driving assembly 3 further includes a standby power supply 33, and the standby power supply 33 is fixed in the driving shell 31 and is arranged adjacent to the light source driver 32. In the embodiment, the continuous use time of the LED lamp is prolonged by the standby power supply 33 after power failure. The standby power supply 33 is connected to light source driver 32 and may be charged and discharged. According to the present application, by setting the standby power supply 33, the lamp may be continuously used for 90 minutes after power failure.

In some embodiments, a section of the lampshade 4 is U-shaped, two free ends of the lampshade 4 are bended outward to form second folded edges 41, the second folded edges 41 are clamped on the buckle 123 in the light source groove 12, the other two ends of the lampshade 4 abuts against the limiting block 141 of the second panel 14, and an inner side of the lampshade 4 is provided with wave grains or bead grains or frosted grains. In the embodiment, when the lampshade 4 is mounted on the lamp panel 1, the second folded edges 41 of the lampshade 4 extend into the light source groove 12. When the second folded edges 41 extend to a certain position, the other two ends of the lampshade 4 abut against the limiting block 141 of the second panel 14, and the buckle 123 is clamped at an included angle between the second folded edges 41 and the free ends of the lampshade 4.

Figure 11:
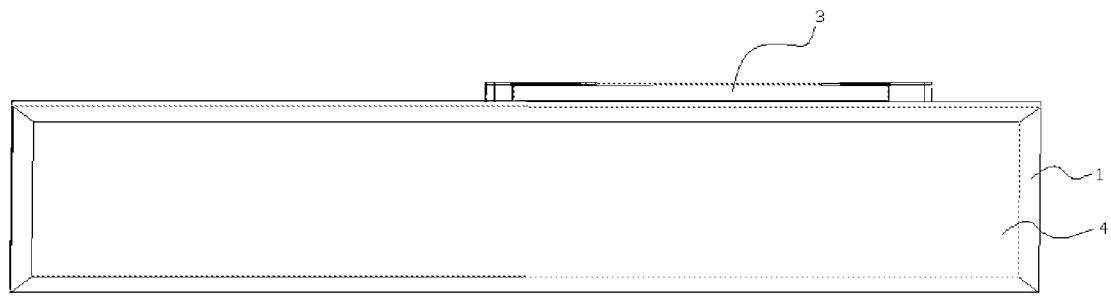
FIG. 11 is a schematic diagram of a panel lamp.
Figure 12:
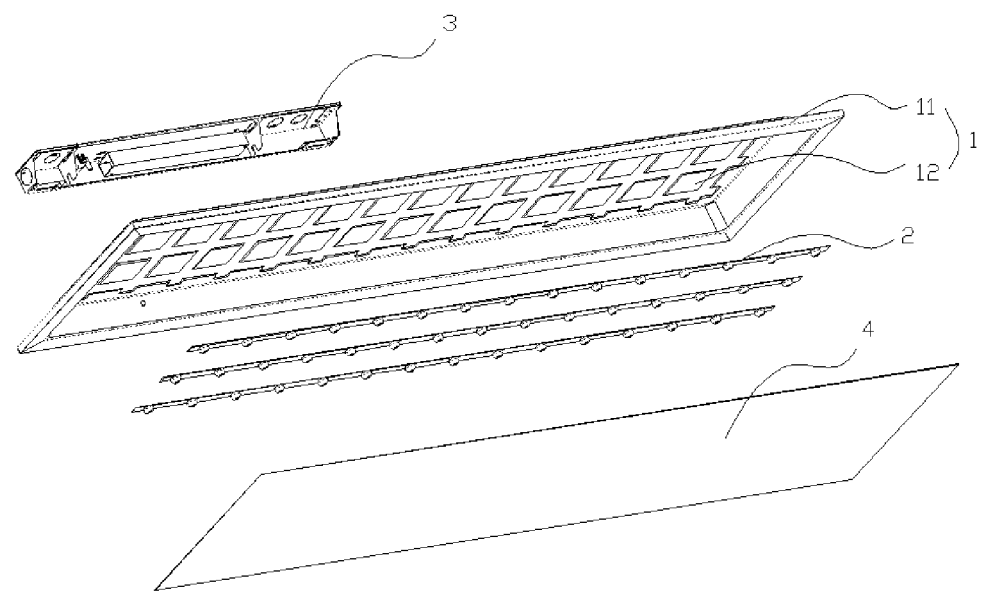
FIG. 12 is an explosive view of a panel lamp.

In some embodiments, referring to FIG. 11 to FIG. 12, the lamp is a panel lamp; the lamp panel 1 includes a light source groove 12 and a surface frame 11; one side of the light source groove 12 is open; the surface frame 11 is arranged along a side wall of the light source groove 12; the lampshade 4 extends into the light source groove 12 along the opening of the light source groove 12 and is in lap joint to an upper surface of the surface frame 11. In the embodiment, the light source groove 12 and the surface frame are integrally stamped and formed by the panel structure according to the present application. The lampshade 4 is a panel structure. The lampshade 4 extends into the light source groove 12 by changing a spatial angle of the lampshade, and then the lampshade 4 is arranged horizontally and may be in lap joint to the upper surface of the surface frame 11. A longitudinally arranged and/or a transversely arranged mounting groove are formed at the bottom of the light source groove 12, a wire groove is formed at the side wall of the light source groove 12, the LED lamp bar 2 is fixed on the mounting groove through glue, and the connecting wire of the LED lamp bar 2 passes through the wire groove and is electrically connected to the light source driving assembly. Specifically, glue is applied to a chassis mounting groove through automatic equipment, and then the LED lamp bar is fixed on the chassis mounting groove without a bolt or pulling rivet. Since a side surface of the light source groove 12 is a reflective film, the reflectivity is greater than 95%. Specifically, the light source driving assembly 3 includes a driving shell and a light source driver arranged in the driving shell; the driving shell is arranged along an outer side of the light source groove 12, the driving shell is provided with a wire hole connected to the wire groove, and the shell is also provided with an opening and closing door; and the light source driving assembly 3 further includes a standby power supply, and the standby power supply is fixed in the driving shell and is arranged adjacent to the light source driver. The light source driver is electrically connected to an LED lamp strip through the connecting wire for driving the LED lamp to emit light. The LED lamp bar 2 is a lamp bar consisting of a plurality of LED patch lamps. A lens may be arranged on each LED patch lamp for softening light.

In addition, the lamp according to the present application is not limited to a space lamp or a panel lamp, wherein a length-width ratio of the lamp may be 1*4, 2*4, 2*2 and other specifications. The present application is not limited to the specification and dimensions of the lamp, and lamps of any dimensions adopting the above technical solution fall into the protection scope of the present application.

In some embodiments, an inner side of the lampshade 4 is provided with wave grains or bead grains or frosted grains. The inner side of the lampshade 4 according to the present application is provided with wave grains or bead grains or frosted grains, thereby achieving the anti-glare effect and softening light.

The panel structure according to the present application includes a reflective film layer, an adhesion layer, a base material layer and a protective layer; the reflective film with the reflectivity greater than 95%, the yield strength, a yield strength of each of the base material layer and the reflective film layer is greater than 180 N/mm2, a tensile strength of each of the base material layer and the reflective film layer is 310 N/mm2 to 420 N/mm2, and an elongation percentage of each of the base material layer and the reflective film layer is greater than 35%; the panel structure according to the present application can be applied to stamping of the integrally formed lamp panel 1; the yield is increased and the production efficiency is improved; meanwhile, a reflective film is additionally arranged on the base material layer, thereby improving the reflection effect and reducing the film covering cost. The lamp panel of the lamp according to the present application is integrally stamped and formed by the above panel structure, thereby simplifying the production process, improving the production efficiency and reducing the production cost. The lampshade is fixed on the lamp panel by the buckle and the limiting block, thereby making fixation firmer. First folded edges are formed on the outer frame of the lamp panel according to the present application and the strength of the lamp panel is improved through the first folded edges; meanwhile, connection to the power driving assembly and the hanging buckle is facilitated. The power driving assembly is provided with a power driver; meanwhile, the power driving assembly may be provided with a standby power supply for the sustainable use of the lamp after power failure. The outer frame, the light source groove, the first panel and the second panel are connected into an oblique bottom type lamp panel, so that a plurality of lamp panel may be directly stacked up, thereby reducing the stacking area of the lamp panels and improving the transportation efficiency of the lam panels. The inner side of the lampshade according to the present application is provided with wave grains or bead grains or frosted grains, thereby achieving the anti-glare effect and softening light.

It is apparent that the above embodiments are merely examples for the clarity of the description, and are not intended to limit the implementation manners of the present application. A person of ordinary skill in the art may further make other changes or variations in a different form on the basis of the above description. Herein, examples are unnecessarily provided for all implementation manners. Any modifications, equivalent substitutions and improvements, etc. made within the spirit and the principle of the present application should be included within the protection scope of the claims of the present application.

What is claimed is:

1. A panel structure for stamping of an integrally formed lamp panel, at least comprising a reflective film layer, an adhesion layer, a base material layer and a protective layer, wherein the reflective film layer is arranged on one surface of the base material layer through the adhesion layer, and the protective layer is arranged on the other surface of the base layer; and
the base material layer comprises a metal layer, and a chemical treatment layer arranged on at least one surface of the metal layer; and the adhesion layer covers the reflective film layer on the base material layer by adhering to the chemical treatment layer;
chemical treatment layers are arranged on both sides of the metal layer, the protective layer is a reflective film, and the protective layer adheres to one surface of the base material layer.

2. The panel structure for stamping of the integrally formed lamp panel according to claim 1, wherein the protective layer is paint or a PP back film.

3. The panel structure for stamping of the integrally formed lamp panel according to claim 1, wherein a reflectivity of the reflective film layer is greater than 95%.

4. The panel structure for stamping of the integrally formed lamp panel according to claim 1, wherein a viscosity value of the adhesion layer is 7081 mPa·s.

5. The panel structure for stamping of the integrally formed lamp panel according to claim 1, wherein the metal layer is a steel substrate, and each of the chemical treatment layers is an oxidation layer formed after a surface of the steel substrate is subjected to strong alkali and passivation.

6. The panel structure for stamping of the integrally formed lamp panel according to claim 5, wherein a yield strength of each of the base material layer and the reflective film layer is greater than 180 N/mm$^2$, a tensile strength of each of the base material layer and the reflective film layer is 310 N/mm$^2$ to 420 N/mm$^2$, and an elongation percentage of each of the base material layer and the reflective film layer is greater than 35%.

7. A lamp, comprising a lamp panel, an LED lamp bar, a light source driving assembly and a lampshade, wherein the LED lamp bar is arranged in a light source groove of the lamp panel, the light source driving assembly is arranged outside the light source groove and is electrically connected to the LED lamp bar, the lampshade is arranged at an opening of the light source groove, and the LED lamp bar emits a light source to be projected outward through the lampshade; and
the lamp panel is stamped and formed by the panel structure for stamping of the integrally formed lamp panel according to claim 1.

8. The lamp according to claim 7, being a space lamp, wherein the lamp panel is at least provided with an outer frame, a light source groove, a first panel and a second panel; the light source groove is opened along an projection direction of the light source; two sides of the light source groove are connected to two sides of the outer frame through the first panel; and the second panel is connected among the light source groove, the first panel and the outer frame.

9. The lamp according to claim 8, wherein a mounting hole for mounting the LED lamp bar is formed at the bottom of the light source groove, and a wire groove communicating the light source groove with the outside is formed at the bottom of the light source groove; and a buckle for fixing the lampshade is arranged on a side wall of the light source groove, and a limiting block is arranged on the second panel.

10. The lamp according to claim 8, wherein first folded edges are formed on four sides of the outer wall along an opposite direction of light source protection; and
hanging buckles are arranged on the first folded edges, and a plurality of hanging buckles are fixed on four first folded edges respectively through bolts or pulling rivets.

11. The lamp according to claim 8, wherein an included angle between the first panel and the outer frame is 161° to 165°, an included angle between the second panel and the outer frame is 98° to 102°, and an included angle between the side wall of the light source groove and the first panel is 137° to 141°.

12. The lamp according to claim 8, wherein the LED lamp bar is fixed on the mounting hole of the light source groove through a bolt or a pulling rivet, a connecting wire of the LED lamp bar passes through the wire groove of the light source groove and is electrically connected to the light source driving assembly, an inductor is arranged at the bottom of the light source groove, and the inductor is arranged adjacent to the LED lamp bar.

13. The lamp according to claim 8, wherein the light source driving assembly comprises a driving shell and a light source driver arranged in the driving shell; the driving shell is fixedly connected to the lamp panel through the second panel, one end of the driving shell is in lap joint to the light source groove, and one end of the driving shell abuts against the first folded edges of the outer frame; the driving shell is provided with a wire hole connected to the wire groove, and an opening and closing door is arranged on the shell; and the light source driving assembly further comprises a standby power supply, and the standby power supply is fixed in the driving shell and is arranged adjacent to the light source driver.

14. The lamp according to claim 8, wherein a section of the lampshade is U-shaped, two free ends of the lampshade are bended outward to form second folded edges, the second folded edges are clamped on the buckle in the light source groove, and the other two ends of the lampshade abuts against the limiting block of the second panel.

15. The lamp according to claim 7, wherein the lamp is a panel lamp, the lamp panel comprises a light source groove and a surface frame, one side of the light source groove is open, and the surface frame is arranged along the side wall of the light source groove; and the lampshade extends into the light source groove along the opening of the light source groove and is in lap joint to an upper surface of the surface frame.

16. The lamp according to claim 15, wherein a longitudinally arranged and/or a transversely arranged mounting groove are formed at the bottom of the light source groove, a wire groove is formed at the side wall of the light source groove, the LED lamp bar is fixed on the mounting groove through glue, and the connecting wire of the LED lamp bar passes through the wire groove and is electrically connected to the light source driving assembly.

17. The lamp according to claim 15, wherein the light source driving assembly comprises a driving shell and a light source driver arranged in the driving shell; the driving shell is arranged along an outer side of the light source groove, the driving shell is provided with a wire hole connected to the wire groove, and an opening and closing door is arranged on the shell; and the light source driving assembly further comprises a standby power supply, and the standby power supply is fixed in the driving shell and is arranged adjacent to the light source driver.

18. The lamp according to claim 7, wherein an inner side of the lampshade is provided with wave grains or bead grains or frosted grains.

* * * * *